(12) United States Patent
Greaves, Jr.

(10) Patent No.: US 7,883,103 B1
(45) Date of Patent: Feb. 8, 2011

(54) PROTECTIVE COVER FOR PROTECTING A PAIR OF TOW BAR ARMS

(76) Inventor: John C. Greaves, Jr., 190 Wilson Blvd. North, Naples, FL (US) 34120

( * ) Notice: Subject to any disclaimer, the term of this patent is extended or adjusted under 35 U.S.C. 154(b) by 126 days.

(21) Appl. No.: 12/412,347

(22) Filed: Mar. 26, 2009

Related U.S. Application Data

(60) Provisional application No. 61/039,779, filed on Mar. 26, 2008.

(51) Int. Cl.
*B60D 1/60* (2006.01)
(52) U.S. Cl. .................... 280/507; 280/480; 280/480.1; 280/506
(58) Field of Classification Search ................. 280/507, 280/770, 506, 480, 480.1; 296/136.1, 136.13; 150/154, 166
See application file for complete search history.

(56) References Cited

U.S. PATENT DOCUMENTS

| | | | |
|---|---|---|---|
| 3,557,298 A | * | 1/1971 | Thompson et al. ............ 174/10 |
| 5,527,056 A | | 6/1996 | Hoagland |
| 5,613,250 A | * | 3/1997 | Bell .............................. 2/242 |
| 5,806,873 A | | 9/1998 | Glassman |
| 5,829,775 A | * | 11/1998 | Maxwell et al. ............. 280/507 |
| 6,022,038 A | * | 2/2000 | Maxwell et al. ............. 280/507 |
| D433,661 S | | 11/2000 | Hanson |
| 6,196,587 B1 | * | 3/2001 | Sage .......................... 280/770 |
| 6,332,853 B1 | | 12/2001 | Bowman |
| 6,412,806 B1 | * | 7/2002 | Peacock ..................... 280/507 |
| 6,443,476 B1 | | 9/2002 | Molock |
| D496,322 S | | 9/2004 | Farney et al. |
| 6,857,652 B2 | | 2/2005 | Dougherty |
| 2002/0084643 A1 | * | 7/2002 | Trampe ..................... 280/770 |
| 2006/0061064 A1 | | 3/2006 | Johnson |

* cited by examiner

*Primary Examiner*—Lesley Morris
*Assistant Examiner*—Tashiana Adams
(74) *Attorney, Agent, or Firm*—Eric Karich

(57) ABSTRACT

A protective cover for protecting a pair of tow bar arms has a cover element adapted to fit around the pair of tow arms. The protective cover also includes a fastener adapted for fastening elongate upper edges of the cover element around each of the pair of the tow bar arms once the cover element has been folded along a fold line, so that the cover element substantially surrounds each of the tow bar arms.

13 Claims, 4 Drawing Sheets

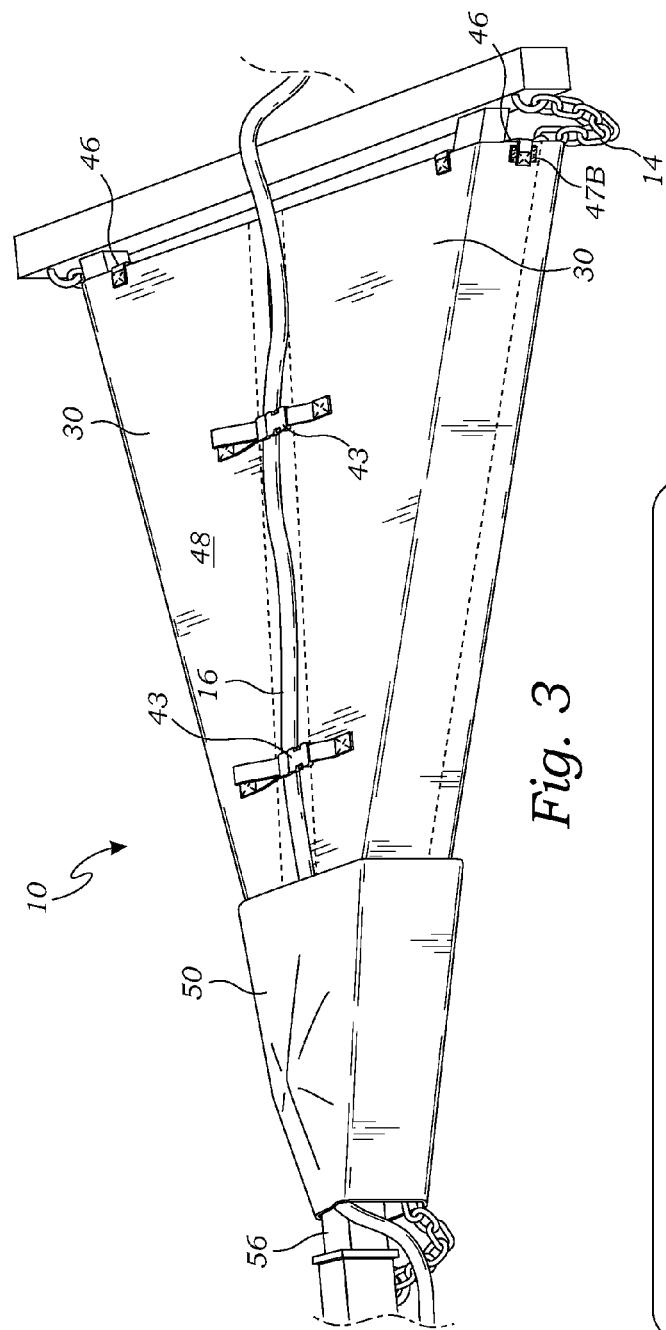
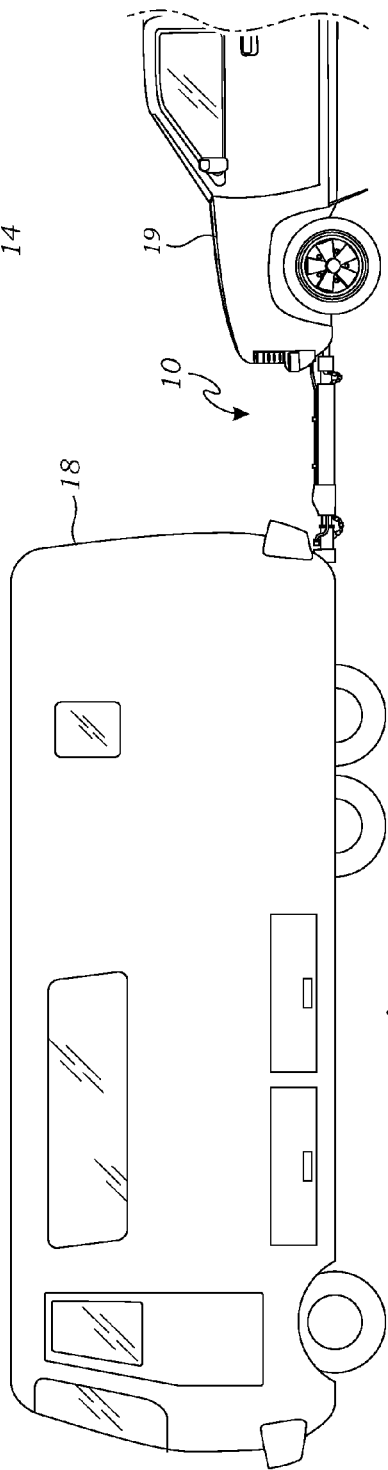

PROTECTIVE COVER FOR PROTECTING A PAIR OF TOW BAR ARMS

CROSS-REFERENCE TO RELATED APPLICATIONS

This application for a patent claims the benefit of U.S. Provisional Application No. 61/039,779, filed Mar. 26, 2008.

STATEMENT REGARDING FEDERALLY SPONSORED RESEARCH

Not Applicable

BACKGROUND OF THE INVENTION

1. Field of the Invention

This invention relates generally to a protective cover, and more particularly to a protective cover for protecting a pair of tow bars.

2. Description of Related Art

The prior art teaches various forms of covers for trailer hitches. The following art defines the present state of the field:

Dougherty, U.S. Pat. No. 6,857,652, teaches a cover for use with a trailer hitch. The cover includes an elongated, hollow, tubular shield internally sized to receive the forward portion of a trailer hitch. The shield wraps around the hitch and is closed at a seam. The shield includes a pouch-like portion sized to snugly encompass and cover the hitch. The seam extends longitudinally from an aft opening toward the front opening and may be selectively manually opened. The cover is also adapted to cover the safety chain beneath the hitch.

Johnson, U.S. 2006/0061064, teaches a similar protective cover for a trailer tongue/hitch. The cover includes an elongated pouch internally sized to receive and encompass the coupler portion and the associated peripheral attachments of a trailer tongue, such as safety chains and electrical wiring, when the trailer is not attached to a towing vehicle. The cover includes an open end sized to slide over the front end of the trailer tongue, and a closed end sized to fittingly enclose and cover the coupler portion of the tongue. The cover can be held in place at the open end by bungee cords or the like.

Glassman, U.S. Pat. No. 5,806,873, teaches a trailer tongue cover which encloses a top of a trailer frame and a jack mechanism. The cover is preferably a soft, lightweight protective cover which is made of a flexible, yet durable, water repellent material, such as a heavy gauge vinyl. The cover includes a jack compartment which extends vertically upward from a V-shaped top portion of the cover which rests directly upon the trailer frame members. The cover is secured to the trailer frame by simple ties which pass through eyelets located on the sides of the cover and which pass underneath the frame members. The ties are preferably single drawstrings knotted at opposing side eyelets to secure the cover from being lifted off.

Other similar covers of interest include Maxwell et al., U.S. Pat. No. 6,022,038, Maxwell et al., U.S. Pat. No. 5,829,775, Hoagland, U.S. Pat. No. 5,527,056, Bowman, U.S. Pat. No. 6,332,853, Molock, Jr., U.S. Pat. No. 6,443,476, Hanson, D433,661, and Farney et al., U.S. D496,322. All of the above-described references are hereby incorporated by reference in full.

The prior art includes covers for use with a trailer hitch and for protecting tow bars while in storage. However, the prior art does not teach a tow bar cover constructed as claimed for protecting tow bars and securing towing components while the tow bars are in use. The present invention fulfills these needs and provides further related advantages as described in the following summary.

SUMMARY OF THE INVENTION

The present invention teaches certain benefits in construction and use which give rise to the objectives described below.

The present invention provides a protective cover for protecting a pair of tow bar arms. The protective cover comprises a cover element adapted to fit around the pair of tow arms; and a fastener adapted for fastening elongate upper edges of the cover element around each of the pair of the tow bar arms once the cover element has been folded along a fold line, so that the cover element substantially surrounds each of the tow bar arms.

A primary objective of the present invention is to provide a protective cover having advantages not taught by the prior art.

Another objective is to provide a protective cover which improves the operating environment of the tow bar components by shielding them from dirt and debris while in use.

A further objective is to provide a protective cover that organizes all the tow components between the vehicles.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 3 is a perspective view of the protective cover, illustrating the protective cover in a closed position around the pair of tow bars;

FIG. 4 is a perspective view of the protective cover, illustrating the protective cover installed between a towing vehicle and a towed vehicle.

DETAILED DESCRIPTION OF THE INVENTION

Figure 1:
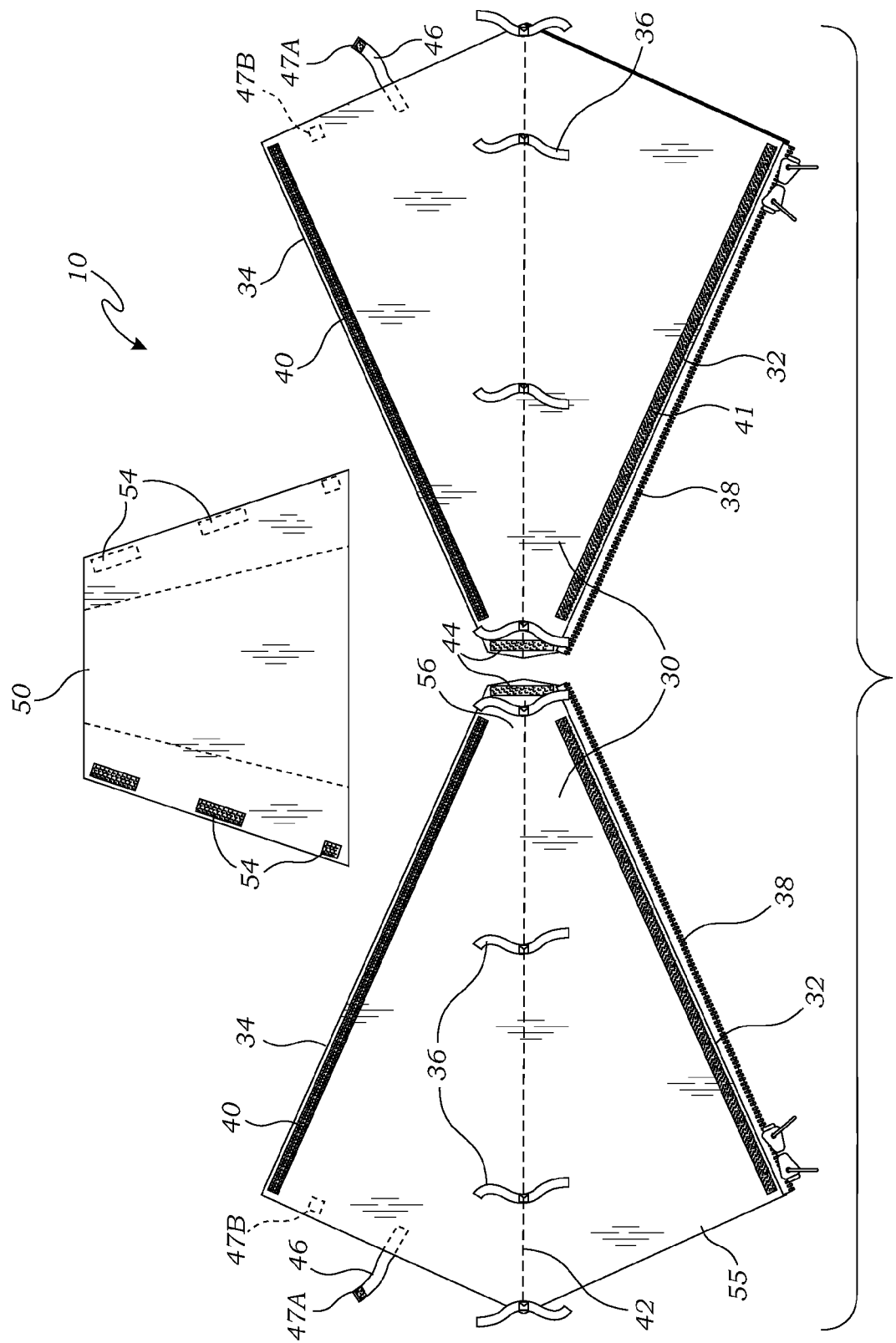
FIG. 1 is a bottom plan view of a protective cover according to one embodiment of the present invention.

The above-described drawing figures illustrate the invention, a protective cover 10 for protecting a pair of tow bar arms 12. The protective cover 10 is adapted to be installed on the tow bar arms 12 while the tow bar arms 12 are in use, operably installed between a towing vehicle 18 and a towed vehicle 19. The protective cover 10 functions to protect the tow bar arms 12 from dirt and debris thrown up by a towing vehicle 18 (as illustrated in FIG. 4), especially in wet conditions. The protective cover 10 also function to secure components between the towing vehicle 18 and the towed vehicle 19, including a safety chain 14 and electrical wiring 16, also as illustrated in FIG. 4.

FIG. 1 is a bottom plan view of the protective cover 10 according to one embodiment of the present invention. In the embodiment of FIG. 1, the protective cover 10 includes a pair of cover elements 30. In this embodiment, each of the cover elements 30 include an elongate lower edge 32, an elongate upper edge 34, an inner surface 49, and an opposed top surface 48 (shown in FIG. 3).

As shown in FIG. 1, the elongate lower edge 32 has a first fastener 38 for fastening the elongate lower edges 32 of the pair of cover elements 30 together beneath the pair of tow bar arms 12. The elongate upper edge 34 has second fasteners 40 and 41 for fastening the elongate upper edge 34 of each of the cover elements 30 around one of the tow bar arms 12 once the cover element 30 has been folded along a fold line 42 between the elongate upper edge 34 and elongate lower edge 32. When folded, each of the cover elements 30 substantially surrounds one of the tow bar arms 12.

In one embodiment, the first fasteners 38 are each half of a zipper. The first fastener 38 of each of the cover elements 30 zip together in a manner well known in the art, ensuring a simple and sturdy connection between the two cover elements 30. While the present invention shows a zipper closure, any other releasable closure known in the art could be used such as a snaps, buttons, a hook and loop fastener, or a similar or otherwise equivalent closure, or any similar element known in the art. In alternate embodiments, the first fastener 38 may be a permanent seam connecting the cover elements 30 forming one single cover element.

The second fastener 40 and 41 of the present embodiment is a hooks and loops fastener where the hook side of the fastener 40 attaches to and releasably engages the loops side of the fastener 41. As discussed above, when folded, the cover elements 30 surround the tow bar 12, and the hooks side of the fastener 40 is engaged to the loops side of the fastener 41. While the present invention uses this form of closure, any other suitable closures may be used, including but not limited to such as zippers, snaps, buttons, or any other closure known in the art would suffice for the first and second fasteners 40 and 41.

Figure 2:
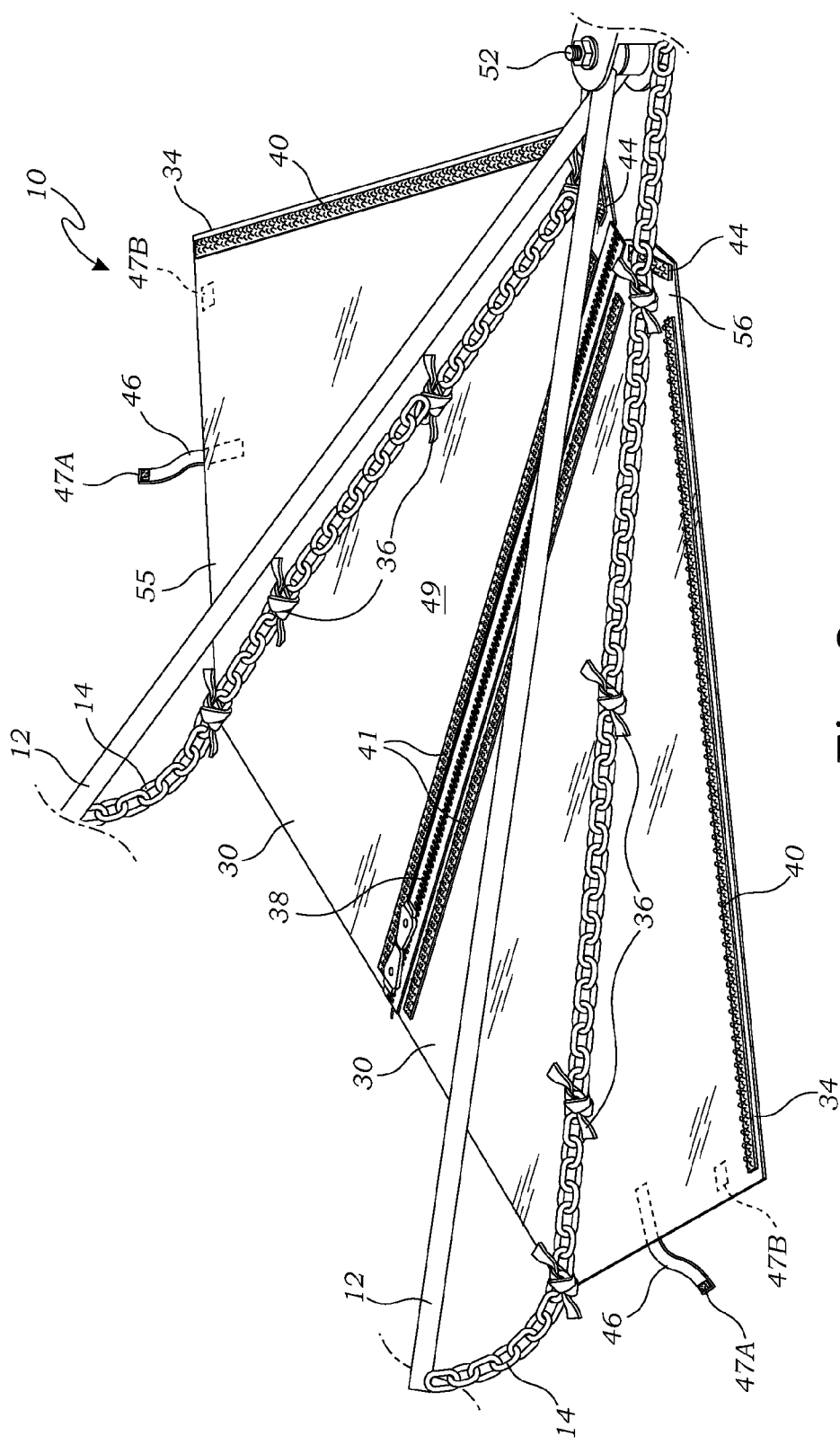
FIG. 2 is a perspective view of the protective cover, illustrating the protective cover in an open position beneath a pair of tow bars as the protective cover is being installed.

FIG. 2 is a perspective view of the protective cover 10 as used with the pair of tow bar arms 12, illustrating the protective cover 10 in an open position. As shown FIG. 2, when the pair of cover elements 30 are connected by the first fastener 38, the cover elements 30 span the space between the pair of tow bar arms 12.

Chain fasteners 36 are provided along the inner surface 49 of each of the cover elements 30 for securing the safety chain 14 within the cover element 30 adjacent the fold line 42 of each cover element 30. In the present embodiment, the chain fasteners 36 are a pair of tie cords. The safety chain 14 runs through the center of the chain fasteners 36 with the ends of the chain fasteners 36 being tied together over the safety chain 14 to secure the safety chain 14. However, in alternative embodiments, the chain fasteners 36 may be another form of tie, hook, loop, or securing element for fastening the safety chain 14 in place, and such alternatives should be considered within the scope of the term "chain fastener."

As shown in FIG. 2, the protective cover 10 may have an inner fastener 44 for fastening each of the cover elements 30 to the tow bar 12 adjacent a towing vehicle 18. In the present embodiment, the inner fastener 44 is a hooks and loops fastener such as Velcro®. The inner fastener 44 is adapted to encompass the tow bar 12 and releasably engage itself around the tow bar where the hooks contact the loops of the inner fastener 44. In alternative embodiments, the inner fastener 44 may also be tie straps or any other fastener for removably attaching or securing the protective cover 10

Each of the cover elements 30 may also have an outer fastener 46 for fastening the cover elements 30 to the tow bar 12 adjacent a towed vehicle 19. In the present embodiment, the outer faster 46 is a tab extending from the cover elements 30. At the end of each tab 46 is a hooks end 47A of a hooks and loops fastener. The loops end 47B of the outer fastener 46 is mounted on the cover element 30 adjacent the tab 46. The tab 46 is adapted to be wrapped around the tow bar 12 and secured to the cover element 30 by virtue of the hooks end 47A and the loops end 47B (as shown in FIG. 3). While the present invention uses hooks and loops fasteners for securing the inner and outer fasteners 44 and 46, any other securing method could be used, including but not limited to snaps, a pair of tie-together tabs, or any other releasable securing device known in the art. Furthermore, the outer fastener 46 may alternatively be other forms of tie-straps, hooks, loops, or other forms of fasteners that are equivalent or otherwise known in the art.

FIGS. 3 and 4 are perspective views of the protective cover 10, illustrating the protective cover 10 as used with the tow bars 12 while the tow bars 12 are in use between a towing vehicle 18 and a towed vehicle. In these views, the protective cover 10 is shown in a closed position, once the protective cover 10 has been installed.

As shown in FIG. 3, when the pair of cover elements 30 are connected by the second fastener 40 and 41 (shown in FIG. 2), an upper surface 48 of the pair of cover elements 30 supports the electrical wiring 16. The electrical wiring 16 is preferably secured adjacent the upper surface 48 by buckles 43 attached to the upper surface 48 of each of the cover elements 30 and fastened together above the electrical wiring 16. While this embodiment uses the buckles 43, the term "buckles" is hereby defined to include any other securing method could be used in the manner described, including but not limited to a pair of tie-together tabs, a pair of hooks and loops tabs, or any other securing element known in the art.

As shown in FIGS. 1-4, a bonnet 50 is used to cover a receiver 52 on the towing vehicle 18. The bonnet 50 may be a generally planar sheet of material that includes a plurality of releasable fasteners 54 adapted to secure the bonnet 50 around the receiver 52 while overlapping a towing end 56 of the pair of cover elements 30. The bonnet 50 is adapted to wrap around the receiver 52, as shown in FIG. 3, and the hooks and loops fasteners 54 engage each other underneath the receiver 52 to protect the receiver 52 from dirt, debris, and other contamination from the road during use. Although this embodiment uses hooks and loops fasteners, any other releasable fastener could be used, such as snaps, zippers, magnets, tie-together connectors, or any other releasable fastener known in the art.

Figure 5:
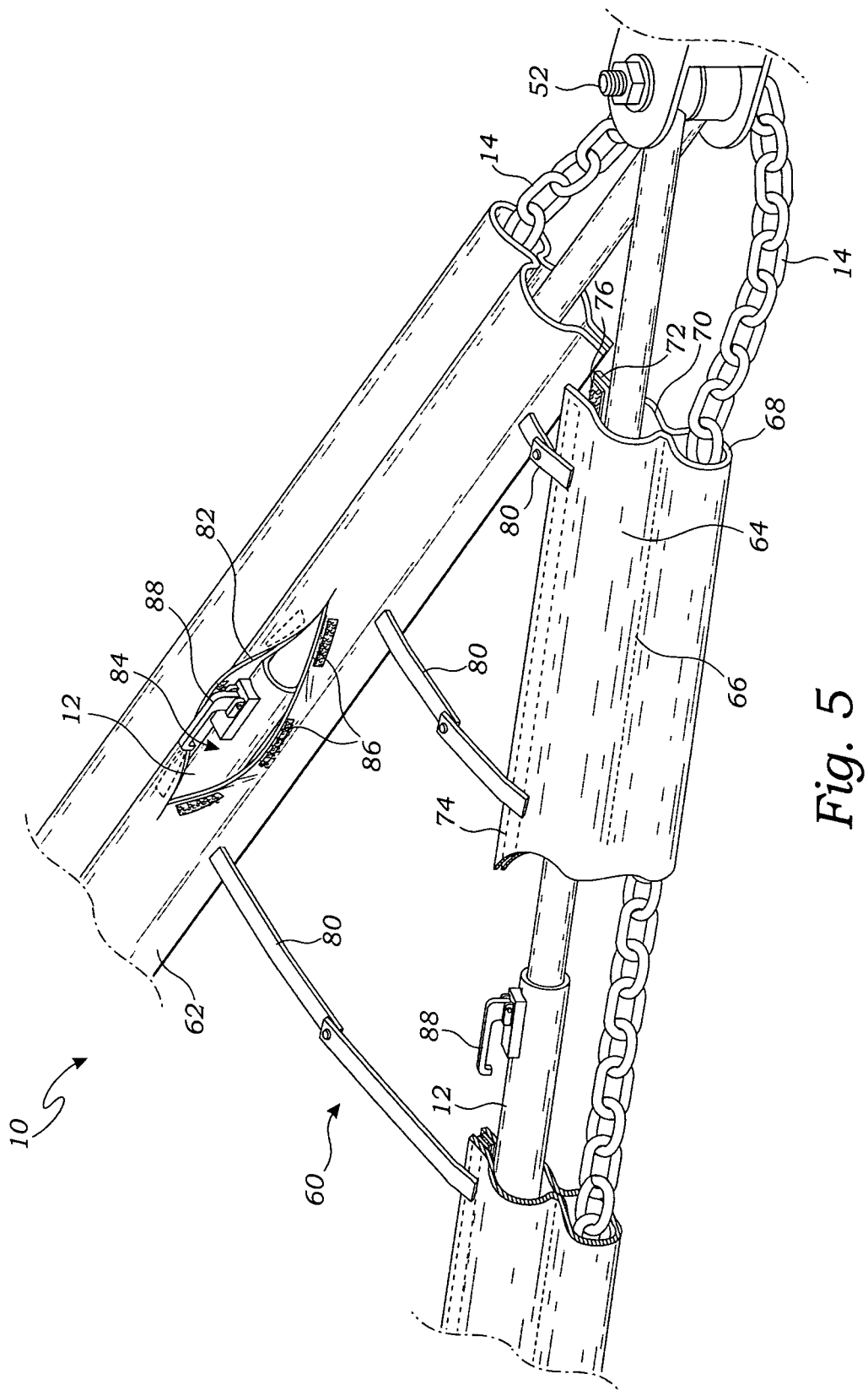
FIG. 5 is a perspective view of an alternative embodiment of the protective cover.

FIG. 5 is a perspective view of an alternative embodiment of the protective cover 60. In the embodiment of FIG. 5, the protective cover 60 includes a pair of cover elements 62 and 64. Each of the cover elements 62 and 64 are long enough to cover a major portion of one of the tow bars 12, and wide enough to wrap completely around the tow bar 12. The cover elements 62 and 64 may each be a flexible and generally rectangular body having a greater length than width. The cover element 62 and 64 may include a first longitudinal edge 72 opposite a second longitudinal edge 74, as described in greater detail below.

In one embodiment, each of the cover element 62 and 64 is sewn to itself with a longitudinal seam 66 to form a chain conduit 68 for receiving the chain 14. The longitudinal seam 66 may be generally parallel to the first and second longitudinal edges 72 and 74. For purposes of this application, the term "longitudinal seam" is hereby defined to include any form of stitching or other forms of fasteners that function to form the chain conduit 68. The term "chain" is hereby defined to include any form of safety chain, cable, or other similar safety device. The term "generally parallel" is hereby defined to include any generally similar or equivalent construction wherein the seam extends at least a portion of the longitudinal length of the cover elements 62 and 64 to form the chain conduit 68, or an equivalent structure for holding and/or positioning the chain 14.

The chain 14 is threaded or otherwise positioned through the chain conduit 68 so that the chain 14 is kept in place, and also protected from dirt and debris, as described above.

Each of the cover elements 62 and 64 includes a flap 70 (or flaps) that extends from the longitudinal seam 66, and may be positioned around the tow bar 12. The flap 70 extends to the first longitudinal edge 72 opposite a second longitudinal edge 74. The first and second longitudinal edges 72 and 74 may be fastened together with a fastener 76 such as hooks and loops fastener (e.g., Velcro®), snaps, buttons, zipper, or any other similar fastener known in the art, to fasten the edges 72 and 74 around the tow bar 12. In the present embodiment, there are two longitudinal edges; however, in an alternative embodiment, one of the edges 72 or 74 may be formed by the outer surface of the chain conduit 68. Other alternative structures that are equivalent are expressly defined to be within the scope of the claimed invention.

In one embodiment, the cover elements 62 and 64 include at least one strap 80 that interconnect (e.g., buckles, ties, etc.) to removably join the cover elements 62 and 64; however, these elements are not required in alternative embodiments. For purposes of this application, the term "strap" is hereby defined to include any form of connecting rope, strip, ribbon, section, or similar element, or a sheet such as described above, or an equivalent construction such as may be devised by one skilled in the art.

In one embodiment, the cover elements 62 and 64 may also include an access aperture 82 that provides an opening 84. A fastener 86 (e.g., Velcro®) adjacent the aperture 82 enables the opening to be closed to protect the tow bar 12. The aperture 82 enables the user access to an adjustment lever 88 of the tow bar 12, so that the lever 88 may be actuated without necessitating removal of the cover 60.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A protective cover for protecting a pair of tow bar arms and for securing a safety chain and electrical wiring, the protective cover comprising:
    a pair of cover elements, each of the cover elements comprising:
        an elongate lower edge having a first fastener for fastening the elongate lower edges of the pair of cover elements together beneath the pair of tow bar arms such that the pair of cover elements together span the space between the pair of tow arms;
        an upper surface of the pair of cover elements adapted to support the electrical wiring;
        an elongate upper edge having a second fastener for fastening the elongate upper edge around one of the pair of the tow bar arms once the cover element has been folded along a fold line between the elongate upper edge and elongate lower edge, so that the cover element substantially surrounds the tow bar arm; and
        a chain fastener for fastening the safety chain within the cover element adjacent the fold line.

2. The protective cover of claim 1, further comprising an inner fastener for fastening the protective cover to the tow bar adjacent a towing vehicle.

3. The protective cover of claim 1, further comprising an outer fastener for fastening the protective cover to the tow bar adjacent a towed vehicle.

4. The protective cover of claim 1, further comprising buckles attached to the upper surface of each of the cover elements and fastened together above the electrical wiring to secure the electrical wiring adjacent the upper surface.

5. The protective cover of claim 1, further comprising a bonnet adapted to cover a receiver on a towing vehicle.

6. The protective cover of claim 5, wherein the bonnet has a plurality of releasable fasteners adapted to secure the bonnet around the receiver.

7. The protective cover of claim 5, wherein the bonnet is adapted to cover the receiver while overlapping a towing end of the pair of cover elements.

8. A protective cover for protecting a pair of tow bar arms between a towed vehicle and a towing vehicle, and for securing a safety chain and electrical wiring between the towed and towing vehicles, the towing vehicle having a receiver for engaging the pair of two bar arms, the protective cover comprising:
    a pair of cover elements, each of the cover elements comprising:
        an elongate lower edge having a first fastener for fastening the elongate lower edges of the pair of cover elements together beneath the pair of tow bar arms such that the pair of cover elements together span the space between the pair of tow arms;
        an upper surface of the pair of cover elements adapted to support the electrical wiring;
        an elongate upper edge having a second fastener for fastening the elongate upper edge around one of the pair of the tow bar arms once the cover element has been folded along a fold line between the elongate upper edge and elongate lower edge, so that the cover element substantially surrounds the tow bar arm; and
        a chain fastener for fastening the safety chain within the cover element adjacent the fold line; and
    a bonnet adapted to cover the receiver on a towing vehicle, the bonnet comprising a plurality of releasable fasteners adapted to secure the bonnet around the receiver while overlapping a towing end of the pair of cover elements.

9. The protective cover of claim 8, further comprising an inner fastener for fastening the protective cover to the tow bar adjacent a towing vehicle.

10. The protective cover of claim 8, further comprising an outer fastener for fastening the protective cover to the tow bar adjacent a towed vehicle.

11. The protective cover of claim 8, further comprising buckles attached to the upper surface of each of the cover elements and fastened together above the electrical wiring to secure the electrical wiring adjacent the upper surface.

12. A protective cover for protecting a pair of tow bar arms and for securing a safety chain, the protective cover comprising:
    a pair of cover elements, each of the cover elements comprising:
        a flexible and generally rectangular body having first and second longitudinal edges;

a longitudinal seam generally parallel to the first and second longitudinal edges, the longitudinal seam connecting the flexible and generally rectangular body to itself to form a chain conduit for receiving the safety chain therethrough, and a flap extending from the chain conduit; and a fastener adapted to removably engage the first and second edges such that the flap surrounds one of the pair of tow bars; and at least one strap that interconnects the pair of cover elements.

13. The protective cover of claim 12, further comprising an access aperture that forms an opening through at least one of the pair of cover elements to enable access to the tow bar, and a fastener adjacent the access aperture for closing the access aperture to protect the tow bar.

* * * * *